(12) United States Patent
Morse

(10) Patent No.: US 7,806,080 B2
(45) Date of Patent: Oct. 5, 2010

(54) ZIPPER SYSTEM FOR REMOVABLE COVERS ON PET FURNITURE

(76) Inventor: Christopher Brooks Morse, 2-6344 Kingsway, Barnaby, B.C. (CA) U5E 1C5

( * ) Notice: Subject to any disclaimer, the term of this patent is extended or adjusted under 35 U.S.C. 154(b) by 145 days.

(21) Appl. No.: 11/633,258

(22) Filed: Dec. 4, 2006

(65) Prior Publication Data

US 2008/0127898 A1    Jun. 5, 2008

(51) Int. Cl.
*A01K 29/00* (2006.01)
*A47G 9/00* (2006.01)

(52) U.S. Cl. .......................... 119/28.5; 5/502

(58) Field of Classification Search ............. 119/28.5; 5/488, 490, 491, 496, 500, 502, 495, 501
See application file for complete search history.

(56) References Cited

U.S. PATENT DOCUMENTS

| 3,381,306 | A | * | 5/1968 | Innes | ............... 2/69 |
| 4,171,549 | A | | 10/1979 | Morrell et al. | |
| 4,312,087 | A | | 1/1982 | De Geus | |
| 4,388,738 | A | * | 6/1983 | Wagner | ............... 5/421 |
| 4,635,306 | A | | 1/1987 | Willey | |
| 4,922,565 | A | * | 5/1990 | Blake | ............... 5/484 |
| 5,144,911 | A | | 9/1992 | Moore et al. | |
| 6,578,217 | B1 | | 6/2003 | Roberson | |
| 6,925,669 | B1 | | 8/2005 | Friedman et al. | |
| 7,370,380 | B2 | | 5/2008 | DeFranks et al. | |

\* cited by examiner

*Primary Examiner*—Michael R Mansen
*Assistant Examiner*—Monica Williams

(57) ABSTRACT

An apparatus for releasably fastening a removable cover to a cushion, the cushion having attached thereto a base cover, is provided. The apparatus includes first and second pairs of spaced apart zipper halves attached to the removable cover and the base cover, respectively. Engaging each zipper half with its corresponding zipper half releasably fastens the removable cover to the base cover. Zipper halves may be attached to the removable cover at opposing sides thereof proximate to the perimeter of the removable cover, including along opposing edges thereof. Zipper halves may be attached to the base cover at opposing sides thereof proximate to the perimeter of the base cover. Zipper halves may be substantially straight and without sharp lateral turns. The cushion may be a pet furniture cushion, and may be an animal bed. The cushion may be a stackable cushion.

22 Claims, 5 Drawing Sheets

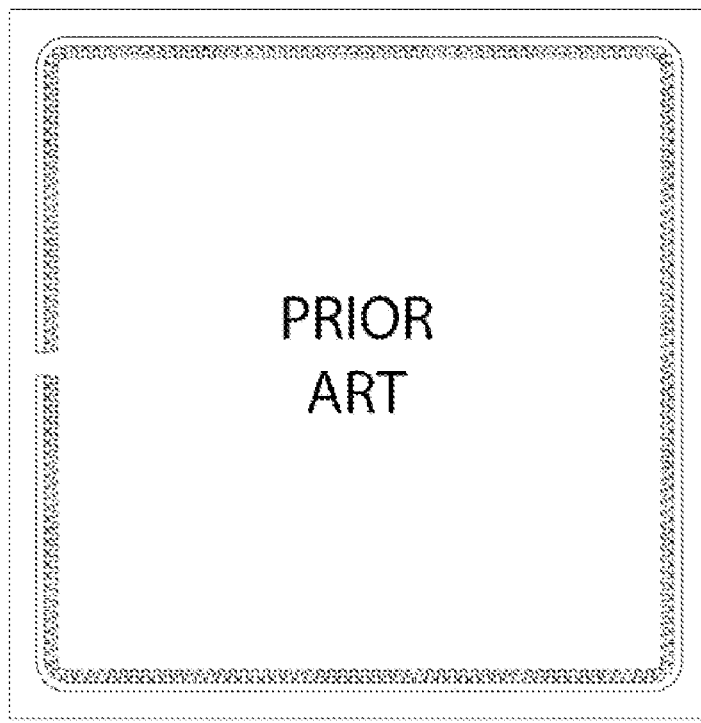
Fig. 1 - Prior Art
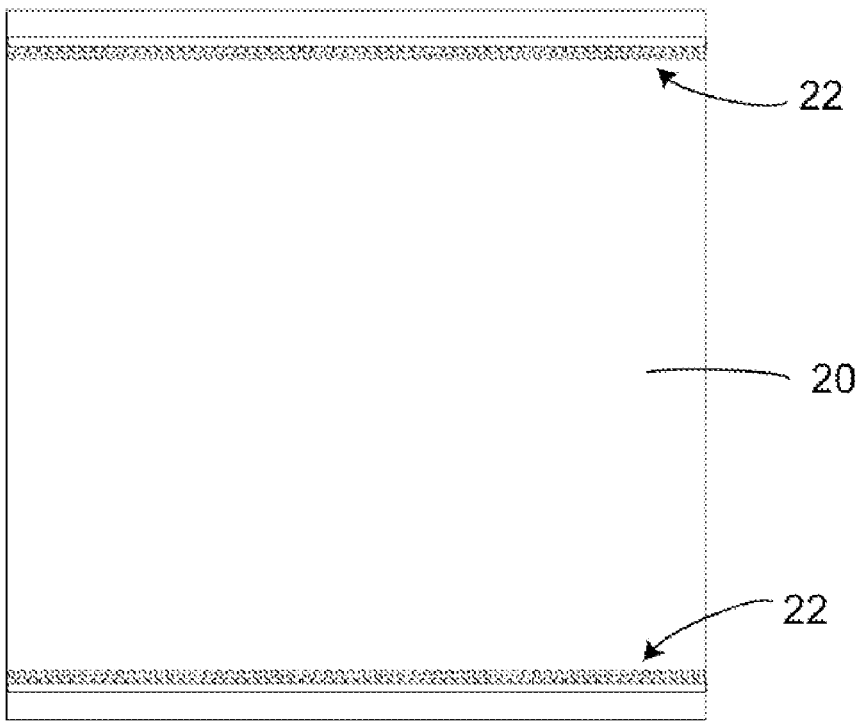
Fig. 2

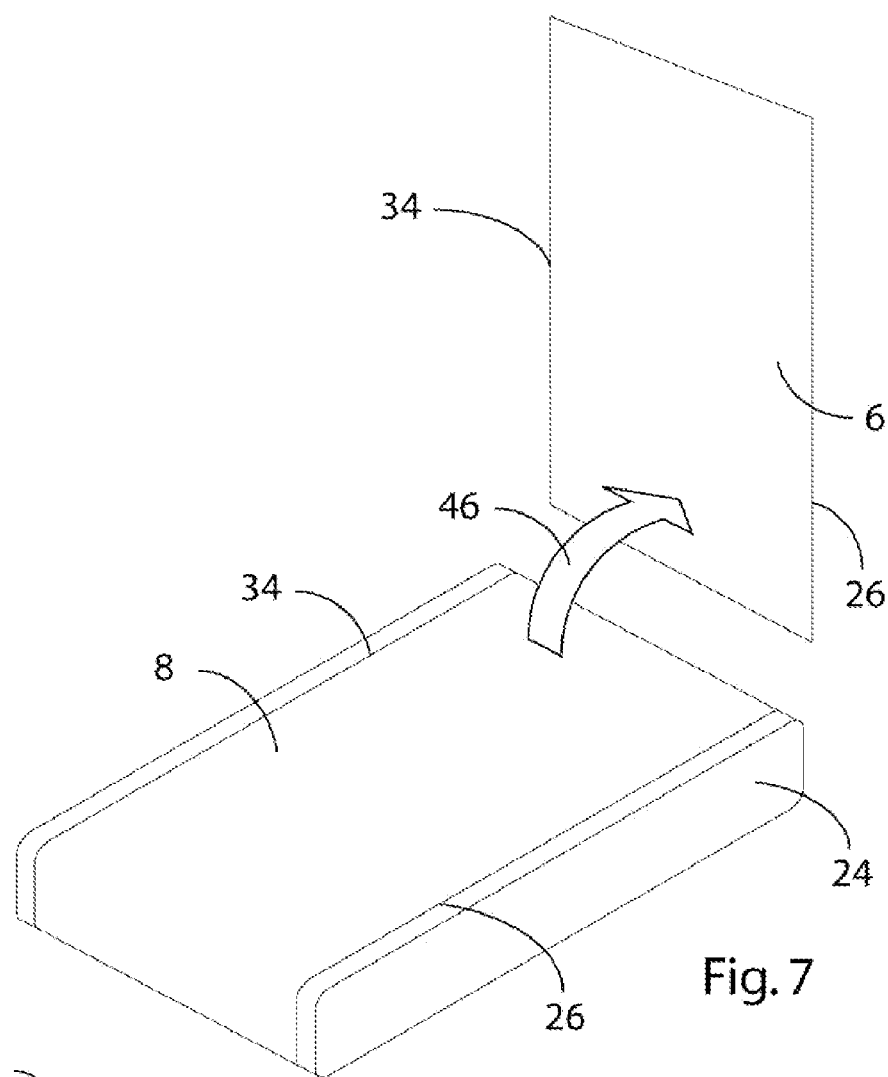
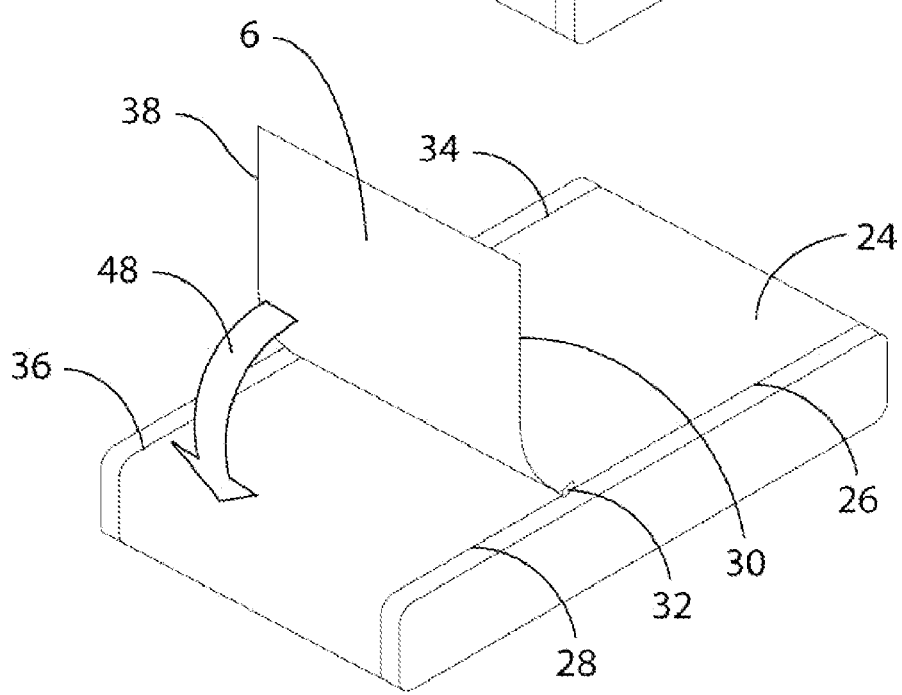

ZIPPER SYSTEM FOR REMOVABLE COVERS ON PET FURNITURE

CROSS REFERENCE TO RELATED APPLICATIONS

None

FEDERALLY SPONSORED RESEARCH

None

SEQUENCE LISTING

None

BACKGROUND

1. Field of Invention

This invention relates to cushions, including cushions for pet furniture, and specifically to a system, apparatus and method for releasably attaching a removable cover to cushions. The system, apparatus and method uses zippers for the releasable attachment of these removable covers.

2. Prior Art

Most pet furniture cushions are designed to be inexpensive to produce. This means that the great majority of beds are made of rather loose fitting material over foam, stuffing or a frame. One reason for this is the ease of manufacturing because if you have a cover that is a bit bigger or smaller in relation to the foam or the frame, it will still fit. An example of this kind of prior art cushion can be seen in FIG. 1. A single zipper is fine in this application because the outer cover fits loosely over the stuffing material and therefore there is much room for error if the cover and the foam and/or frame are of differing sizes.

If furniture and cushioning is to be designed with a more modern esthetic in mind, with cleaner lines and with a material that is pulled tightly over the foam or frame, there is less room for error. A single zipper holding the cover in place is harder to manufacture because if the cover is bigger or smaller than the foam or frame, the cover may not fit.

In the one zipper prior art system shown in FIG. 1, the zipper has to be long enough to extend around all four perimeter sides of the cover. There is also more chance that in the manufacturing of the product that the ends of the zipper will not meet up at the right location after it is sewed in place due to the extra length of the zippers. The longer a zipper is the more likely this is to occur. While this may be acceptable in cases in which the tolerances (possible errors + or − in a given unit) are generous or where the cover is baggy, oversized or otherwise loose, it is desirable to find a better system in cases where there is little room for deviation such as when the covers are tighter.

U.S. Pat. No. 5,144,911 discloses pet furniture with a removable cover and a number of methods to secure the cover including a method using a single zipper system that is attached around the perimeter of the bed. The problem with this is that a zipper cannot go straight and then turn and go 90 degrees in another lateral direction without at least some radius being added to the zipper at the exact location of the change in direction. This radius makes it more difficult to remove and attach the cover, and more difficult to manufacture. It is also has to be a much looser cover in order to fit and possibly more likely to fail at the point that the zipper changes lateral direction. If we were to increase the stress on the zipper by pulling the cover tighter as could be needed for a more modern and clean design, the problem becomes heightened. It would very difficult to use a zipper system such as this with a tighter cover as was just previously described. Attempting to do so would render it very difficult for the cover to be removed and replaced after washing.

U.S. Pat. No. 4,312,087 discloses a cover to be used on foam with a zipper and method of securing the cover in place. The problem with this type of cover system is that it covers the entire foam, so any attempt to embellish the design using differing material and colors would involve sewing them directly into the cover. This would also limit the materials to those that are washable and would exclude leathers as an example, as the whole cover must be removed in order to wash it. When a cover system such as this is used on a product where the cover is tighter such that the stress on the zippers is greater, it becomes much more difficult to restuff the cover after washing. This is one instance when the stress on the cover can be too much for the zipper to hold the cover in place and where going around corners becomes much more difficult. This is when the zipper has a tendency to fail if the stress is great enough.

OBJECTS AND ADVANTAGES

Accordingly, it is an object of the present invention to:

(a) provide a method of having a tighter fitting cover and a more pleasing look to the cushioning such as found in furniture, including a bed;

(b) make the zipper easier to use when removing the cover from the bed as the zipper doesn't have to change lateral direction or go around any radius or other change in direction that can make the zipper catch;

(c) allow the use of materials that are not washable to be used in cushioning that has a removable cover which is washable;

(d) provide an easier to method of manufacturing that avoids sewing a zipper around a 90 degree lateral angle, which is hard to do;

(e) provide a cheaper manufacturing method in which the amount of zipper used is less;

(f) provide a zipper system in which there is less stress placed on the zipper; and (g) provide a cover that is easier to remove by making the zipper easier to access in comparison to prior art techniques in which the zipper extends on top and bottom sides of cushioning.

Additionally, objects and advantages include to create a zipper system for cushioning and furniture, including pet furniture, such that it is easier to remove the covers, easier to clean, has less lateral angles for which the zipper has to maneuver over during use, is easier to return to the bed when finished cleaning and gives the consumer the ability to have numerous covers to use while the one is being cleaned.

SUMMARY

The shortcomings of the prior art described above can be addressed by providing, in accordance with one aspect of the invention, a system for releasably attaching a removable cover to furniture, the furniture having attached thereto a base cover. The system includes: a first pair of separated zipper halves attached to the removable cover proximate to the perimeter of the removable cover; and a second pair of separated zipper halves attached to the base cover proximate to the perimeter of the base cover, the second pair of zipper halves engagingly corresponding to the first pair of zipper halves, wherein engaging the first and second pairs of zipper halves holds the removable cover in place.

The base cover may be made of a waterproof material. The base cover may be made of a water resistant material. The base cover may include a plurality of materials having different material types. The removable cover may be made of a polyester material. The removable cover may be made of a natural material.

In accordance with another aspect of the invention, there is provided an apparatus for releasably fastening a removable cover to a cushion, the cushion having attached thereto a base cover. The apparatus includes: a first pair of spaced apart zipper halves attached to the removable cover; and a second pair of spaced apart zipper halves attached to the base cover, each zipper half of the second pair of zipper halves being operable to engage with a corresponding zipper half of the first pair of zipper halves, wherein respectively engaging each zipper half with its corresponding zipper half releasably fastens the removable cover to the base cover.

The first pair of zipper halves may include first zipper halves attached to the removable cover at opposing sides thereof proximate to the perimeter of the removable cover. The second pair of zipper halves may include second zipper halves attached to the base cover at opposing sides thereof proximate to the perimeter of the base cover. The removable cover may have a substantially rectangular shape. The first zipper halves may be attached to the removable cover along opposing edges thereof. The first pair of zipper halves and the second pair of zipper halves may be substantially straight. The cushion may have a substantially rectangular shape. The cushion may have a stackable shape. The cushion may include a recess. The cushion may be a pet furniture cushion. The apparatus may further include a slider for releasably engaging the first and second pairs of zipper halves. The base cover may include material selected from the group consisting of waterproof material, water resistant material, leather material and non-washable material. The base cover may include a plurality of materials having different material types. The removable cover may include material selected from the group consisting of polyester material, natural material and washable material.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In drawings which illustrate embodiments of the invention,

FIG. 1 is a top view of a square cushion incorporating a prior art zipper system;

FIG. 2 is a top view of a square cushion incorporating a zipper system in accordance with a first embodiment of the invention;

FIG. 7 is a perspective view of the cushion shown in FIG. 1, showing the removable cover fully removed;

FIG. 8 is a perspective view of the cushion shown in FIG. 1, showing the removable cover partly reattached;

DETAILED DESCRIPTION

FIG. 2 shows a square cushion 20 manufactured to incorporate a zipper system 22 in accordance with the first and preferred embodiment of the invention. It will be readily apparent to a person of ordinary skill in the art that a plurality of cushions 20, as shown in FIG. 2, could be stacked one on top of each other. Thus, the cushion 20 has a stackable shape.

Figure 3:
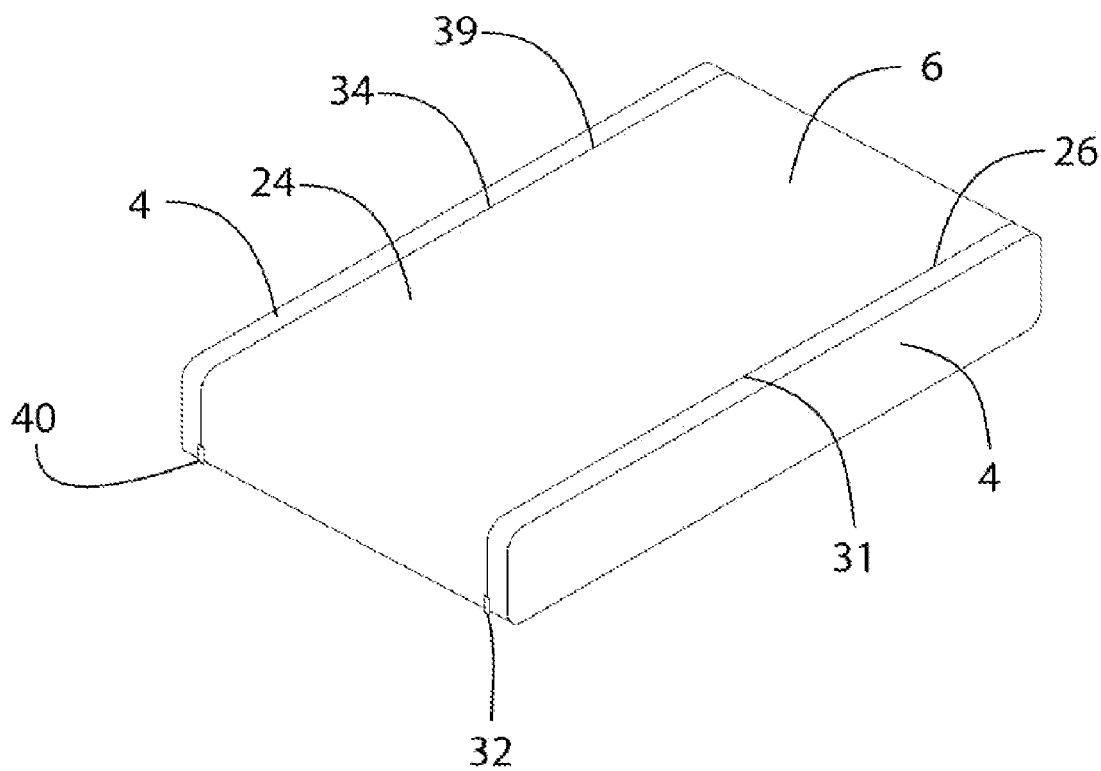
FIG. 3 is a perspective view of the cushion shown in FIG. 1, showing sliders of the zipper system.
Figure 4:
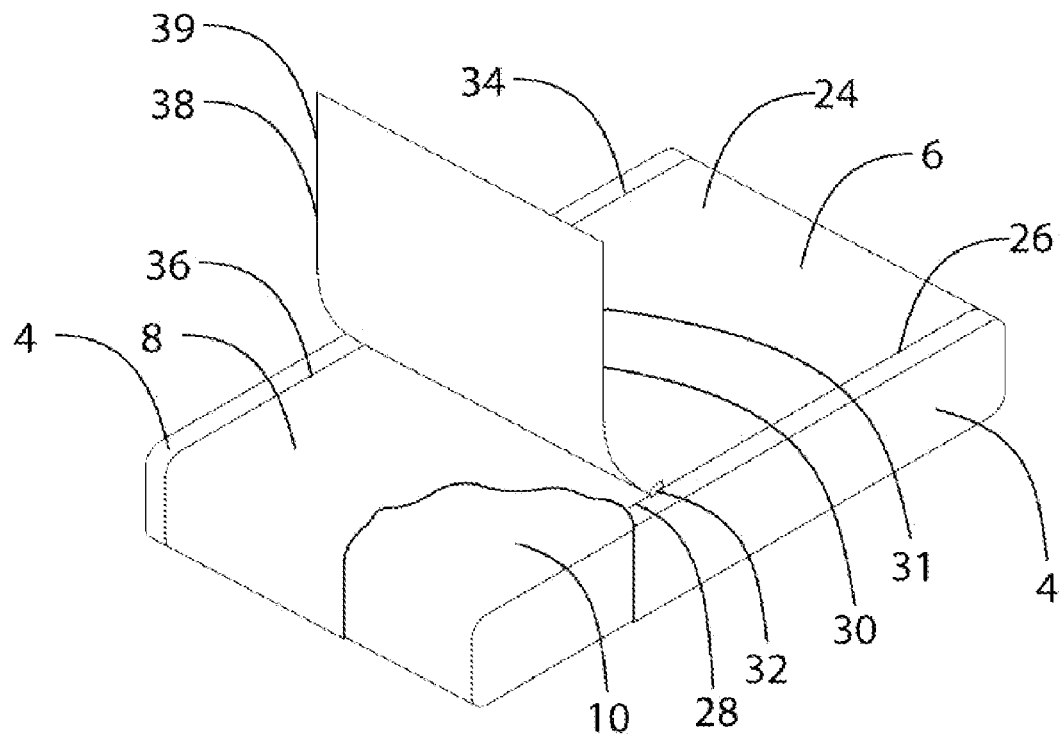
FIG. 4 is a perspective view of the cushion shown in FIG. 1, showing a base cover attached to cushioning.

Referring to FIGS. 3 and 4, the zipper system 22 in accordance with the first embodiment is shown also suitable for incorporation into a rectangular cushion 24. Thus, it can be seen from FIGS. 2 to 4 that the zipper system 22 can be adapted to a variety of cushions, including square cushions, rectangular cushions and cushions of other shapes. The cushion 24 can be suitably made for use in furniture, including pet or other animal furniture such as animal beds. The cushion 24 can be used as a pet furniture cushion. The cushion 24 can be used as an animal bed. A plurality of cushions 24 can be used as a plurality of animal beds. Where the plurality of cushions 24 are used as animal beds, the dimensions of the beds can change as they are made for different sized animals.

It will be readily apparent to a person of ordinary skill in the art that a plurality of cushions 24, as shown in FIG. 3, could be stacked one on top of each other. Thus, the cushion 24 has a stackable shape.

The cushion 24 shown in FIGS. 3 and 4 is preferably manufactured such that it can include the foam, stuffing or means of cushioning 10, the base cover 8 and the removable cover 6. Thus, it can be seen from FIGS. 2 to 4 that the zipper system 22 can be adapted for use with a variety of types of cushioning.

As can be readily seen in FIGS. 3 and 4, the zipper system 22 in accordance with the first embodiment preferably includes a first zipper 26 having a first zipper base half 28 and a first zipper cover half 30. The first zipper 26 is shown in FIGS. 3 and 4 as substantially straight with minimal or no lateral turns. The first zipper 26 preferably includes a slider 32, which is preferably operable to releasably engage the first zipper base half 28 and the first zipper cover half 30 as it slides along the first zipper 26 in a first direction, and to release the first zipper base half 28 and the first zipper cover half 30 as it slides in a second direction opposite the first direction, in a manner generally known in the art.

The zipper system 22 is also shown in FIGS. 3 and 4 as including a second zipper 34 having a second zipper base half 36 and a second zipper cover half 38. The second zipper 34 is shown substantially straight and spaced apart from the first zipper 26. The second slider 40 shown in FIGS. 3 and 4 forms part of the second zipper 34, and is preferably operable in a manner similar to the slider 32.

The first zipper 26 and the second zipper 34 function to fasten the removable cover 6 from the base cover 8. Thus, while FIGS. 3 and 4 show the first zipper 26 and the second zipper 34 as being parallel to each other and each substantially straight, it will be appreciated by a person of ordinary skill in the art that the first zipper 26 and the second zipper 34 can be parallel, close to parallel or need not be parallel, but that various arrangements, dimensions and shapes permitting the first and second spaced apart zippers 26 and 34 to releasably fasten the removable cover 6 from the base cover 8 are within the scope contemplated by the present invention.

It is readily apparent from FIGS. 3 and 4 that the first zipper 26 and the second zipper 34 do not laterally curve sharply to the left or right in the plane of the top or other side of the cushion 24, even though the first and second zippers 26 and 34 radially curve in a perpendicular plane to the top or other side of the cushion 24. The radial curves occur as the first and second zippers 26 and 34 travel from one side, such as the front or rear side, to another side, such as the top side, of the cushion 24. The avoidance of sharp lateral curves in the first and second zippers 26 and 34 advantageously permits the use of a less wrinkled, less buckled and tighter base cover 8 and removable cover 6, helps to easily remove the removable cover 6 for washing and for replacing, allows the base cover 8 to include a plurality of different materials, allows the base cover 8 to include non-washable material such as leather, eases manufacturing of the cushion 24, eases operation of the zipper system 22, allows for an operationally smoother zipper, allows the cushion 24 to be more similar to modern furniture in appearance, permits the cushion 24 to maintain clean lines of a modern look, and permits other advantageous features that add real value to the product of the cushion 24. It will be understood by a person or ordinary skill in the art that sharp lateral curves in the first and second zippers 26 and 34 can be avoided by manufacturing the first and second zippers 26 and 34 to have substantially straight shapes, as shown in FIGS. 3 and 4, or a variety of other shapes that avoid sharp lateral curves.

Still referring to FIGS. 3 and 4, the base cover 8 is placed over the stuffing, foam or means of cushioning 10, and can be placed over the stuffing, foam or means of cushioning 10 in a similar fashion to the placement of covers on sofa cushions. In the first embodiment, the removable cover 6 is attached to the base cover 8 using the first zipper 26 and the second zipper 34.

The first zipper cover half 30 is attached at one end of the removable cover 6 proximate the perimeter thereof, as shown in FIGS. 3 and 4. FIGS. 3 and 4 also show the first zipper cover half 30 disposed along an edge 31 of the removable cover 6. The second zipper cover half 38 is attached to the removable cover 6 on an opposite end of the removable cover 6 proximate to the perimeter thereof, as seen in FIGS. 3 and 4. FIGS. 3 and 4 also show the second zipper cover half 38 disposed along an edge 39 of the removable cover 6. The removable cover 6 is shown in FIGS. 3 and 4 as being rectangular. The first zipper cover half 30 and the second zipper cover half 38 form a first pair of zipper halves. The first zipper base half 28 is attached to the base cover 8 at one end thereof proximate to the perimeter of the base cover 8, as shown in FIGS. 3 and 4. The second zipper base half 36 is attached to the base cover 8 at an opposite end thereof proximate to the perimeter of the base cover 8, as shown in FIG. 4. The first zipper base half 28 and the second zipper base half 36 form a second pair of zipper halves.

The first zipper base half 28 and the first zipper cover half 30 engagingly correspond to each other such that the first zipper 26 can be engaged or zipped. The second zipper base half 36 and the second zipper cover half 38 engagingly correspond to each other such that the second zipper 34 can be engaged or zipped.

The removable cover 6 can be put into place or otherwise releasably fastened to the base cover 8 by placing together the first and second zippers 26 and 34, and simply zipping the removable cover 6 into place by respectively fastenably engaging the first and second zippers 26 and 34, as seen in FIG. 8.

Figure 5:
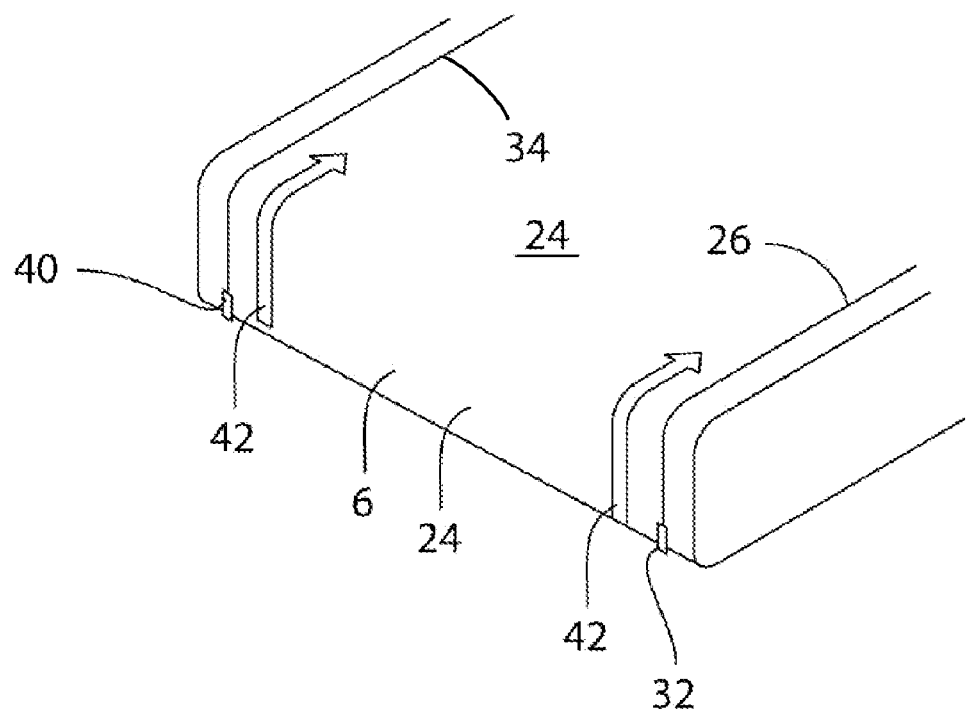
FIG. 5 is a perspective view of the cushion shown in FIG. 1, showing a direction of unzipping.

FIG. 5 shows the location of the start of the first and second zippers 26 and 34 where the removable cover 6 is first detached.

Figure 6:
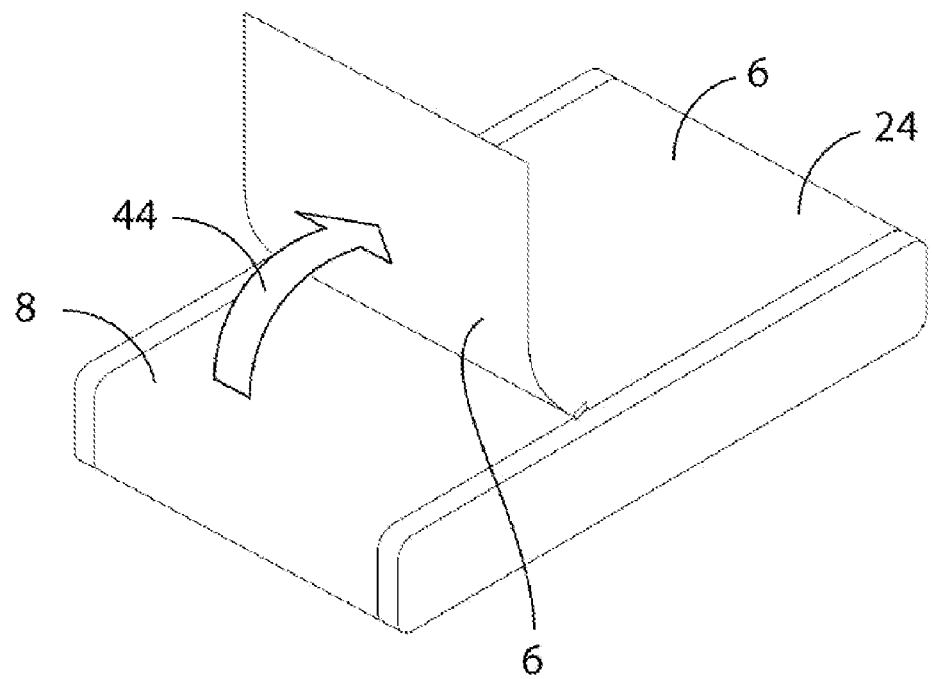
FIG. 6 is a perspective view of the cushion shown in FIG. 1, showing a removably cover partly removed.
Figure 10:
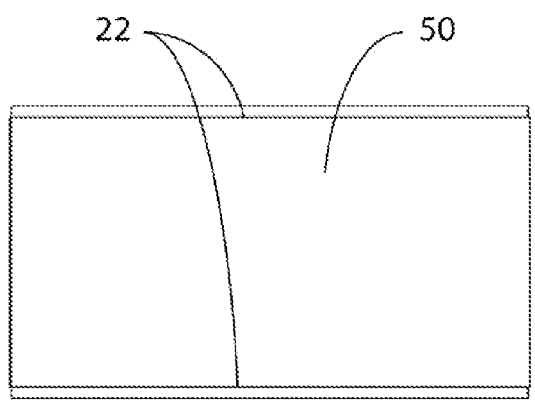
FIG. 10 is a top view of the alternatively shaped cushion shown in FIG. 9.

FIG. 6 shows the first and second zippers 26 and 34 fully engaged, thereby releasably fastening the removable cover 6 to the cushion 24. The pair of arrows 42 indicate the direction in which to slide the slider 32 to disengage the first zipper 26 and the direction in which to slide the slider 40 to disengage the second zipper 34.

FIGS. 6 to 8 show how the removable cover 6 is removed and then once again zipped into place.

Referring back to FIGS. 3 and 4, the cushion 24 in accordance with the first embodiment of the invention is illustrated.

FIG. 3 illustrates the preferred embodiment of the invention in which the removable cover 6 is closed and attached by the first and second zippers 26 and 34 to the base cover 8. The base cover 8 is shown in FIGS. 3 and 4 as including two panels 4 which are preferably sewn into place. The panels 4 are shown in FIGS. 3 and 4 as disposed along opposing sides of the cushion 24. A material type of one or both of the panels 4 may differ from that of other parts of the base cover 8. A material of the base cover 8 may be a waterproof material, a water resistant material, leather material, a non-washable material or any combination thereof that may be known to a person of ordinary skill in the art, for example.

A material of the removable cover 6 may be a polyester material, a natural material, a washable material or any combination thereof that may be known to a person of ordinary skill in the art, for example.

FIG. 4 illustrates the stuffing, foam or means of cushioning 10 covered by the base cover 8. In the embodiment shown in FIG. 4, the base cover 8 is attached to the removable cover 6 by the means of two relatively parallel zippers, namely the first and second zippers 26 and 34.

Thus, there is provided an apparatus for releasably fastening a removable cover to a cushion, the cushion having attached thereto a base cover. The apparatus includes: a first pair of spaced apart zipper halves attached to the removable cover; and a second pair of spaced apart zipper halves attached to the base cover, each zipper half of the second pair of zipper halves being operable to engage with a corresponding zipper half of the first pair of zipper halves, wherein respectively engaging each zipper half with its corresponding zipper half releasably fastens the removable cover to the base cover. The first pair of zipper halves may include first zipper halves attached to the removable cover at opposing sides thereof proximate to the perimeter of the removable cover. The second pair of zipper halves may include second zipper halves attached to the base cover at opposing sides thereof proximate to the perimeter of the base cover.

Operation

Referring to FIGS. 5 to 8, the zipper system 22 can be released by unzipping both the first and second zippers 26 and 34, and then removing the removable cover 6. To reattach the removable cover 6, a person can zip the first and second zippers 26 and 34 such that the removable cover 6 will be held in place.

FIG. 5 illustrates the first embodiment of the invention, showing the first and second zippers 26 and 34 entirely closed and showing the removable cover 6 attached to the base cover 8 by the means of the first and second zippers 26 and 34.

FIG. 6 illustrates the removable cover 6 in the process of removal from the base cover 8. The removal arrow 44 indicates the direction of removal when unzipping the first and second zippers 26 and 34 in order to unfasten or release the removable cover 6 from the base cover 8. FIG. 6 shows the removable cover 6 partly removed from the base cover 8. The removable cover 6 may be washable.

FIG. 7 illustrates the removable cover 6 completely detached from the base cover 8. The detachment arrow 46 shows the direction in which the removable cover 6 is detached from the base cover 8 after the first and second zippers 26 and 34 have been completely unzipped to completely unfasten or release the removable cover 6 from the base cover 8.

FIG. 8 illustrates the removable cover 6 in the process of being reattached to the base cover 8 by the means of the first and second zippers 26 and 34. The fastening arrow 48 shows the direction in which the slider 32 is slid to releasably engage the first zipper base half 28 and the first zipper cover half 30. Such releasable engagement occurs as the slider 32 slides along the first zipper 26 in the fastening arrow 48 direction. The fastening arrow 48 also shows the direction in which the slider 40 (not visible in FIG. 8) is slid to releasably engage the second zipper base half 36 and the second zipper cover half 38. Such releasable engagement occurs as the slider 40 (not visible in FIG. 8) slides along the second zipper 34 in the fastening arrow 48 direction.

Figure 9:
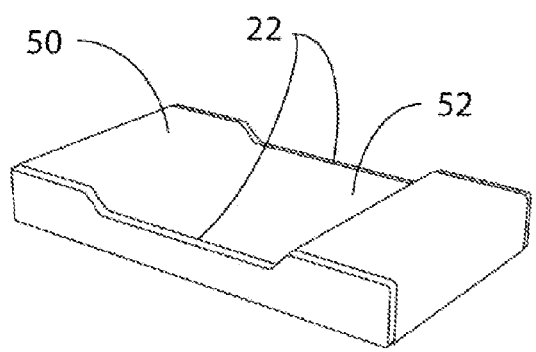
FIG. 9 is a perspective view of an alternatively shaped cushion incorporating the zipper system in accordance with the first embodiment of the invention.
Figure 11:
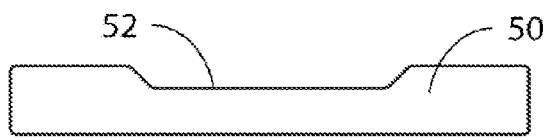
FIG. 11 is a front view of the alternatively shaped cushion shown in FIG. 9.
Figure 12:
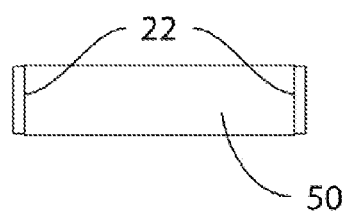
FIG. 12 is a side view of the alternatively shaped cushion shown in FIG. 9.

Referring to FIGS. 9 to 12, a cushion 50 incorporates the zipper system 22 in accordance with the first embodiment of the invention. The cushion 50 is shown in FIG. 9 as including a recess 52 in its shape, thereby demonstrating the use of the zipper system 22 in conjunction with a plurality of cushion shapes. The recess 52 is not visible in FIGS. 10 and 12, which show top and side views of the alternatively shaped cushion 50. However, the recess 52 is readily seen in FIG. 11, which shows a front view of the cushion 50. It will be readily apparent to a person of ordinary skill in the art that a plurality of cushions 50, as shown in FIGS. 9 to 12, could be stacked one on top of each other. Thus, the cushion 50 has a stackable shape.

While embodiments of the invention have been described and illustrated, such embodiments should be considered illustrative of the invention only. The invention may include variants not described or illustrated herein in detail. For example, mechanical equivalents can be employed without detracting from the advantages of the present invention. Thus, the embodiments described and illustrated herein should not be considered to limit the invention as construed in accordance with the accompanying claims.

The invention claimed is:

1. A system for releasably attaching a removable cover to furniture, the furniture having attached thereto a base cover, the system comprising:
    (a) a first pair of separated zipper halves attached to the removable cover proximate to the perimeter of the removable cover, said first pair comprising a first zipper half and a second zipper half; and
    (b) a second pair of separated zipper halves attached to the base cover proximate to the perimeter of the base cover, said second pair of zipper halves engagingly corresponding to said first pair of zipper halves,
    wherein said base cover fully encloses the furniture, wherein said removable cover is not permanently attached to the base cover and wherein engaging said first and second pairs of zipper halves holds the removable cover in place such that said first zipper half extends substantially along a first plane and said second zipper half extends substantially along a second plane substantially parallel to said first plane, thereby releasably attaching the removable cover to the furniture.

2. The system of claim 1 wherein said base cover is made of a waterproof material.

3. The system of claim 1 wherein said base cover is made of a water resistant material.

4. The system of claim 1 wherein said base cover comprises a plurality of materials having different material types.

5. The system of claim 1 wherein said removable cover is made of a polyester material.

6. The system of claim 1 wherein said removable cover is made of a natural material.

7. The system of claim 1 wherein the furniture is pet furniture.

8. The system of claim 7 wherein said pet furniture comprises an animal bed.

9. An apparatus for releasably fastening a removable cover to a cushion, the cushion having attached thereto a base cover, the apparatus comprising:
    (a) a first pair of spaced apart zipper halves attached to the removable cover, said first pair comprising a first zipper half and a second zipper half; and
    (b) a second pair of spaced apart zipper halves attached to the base cover, said first zipper half and said second zipper half being operable to engage with a corresponding zipper half of said second pair of zipper halves,
    wherein said base cover fully encloses the furniture, wherein said removable cover is not permanently attached to the cushion and wherein respectively engaging said first zipper half and second zipper half with each said corresponding zipper half releasably fastens the removable cover to the base cover of the cushion such that when fastened said first zipper half extends substantially along a first plane and said second zipper half extends substantially along a second plane substantially parallel to said first plane.

10. The apparatus of claim 9 wherein said first zipper half and said second zipper half are attached to the removable cover at opposing sides thereof proximate to the perimeter of the removable cover, and wherein said corresponding zipper halves are attached to the base cover at opposing sides thereof proximate to the perimeter of the base cover.

11. The apparatus of claim 9 wherein the removable cover has a substantially rectangular shape.

12. The apparatus of claim 9 wherein said first zipper half and said second zipper half are attached to the removable cover along opposing edges thereof.

13. The apparatus of claim 9 wherein said first pair of zipper halves and said second pair of zipper halves are substantially straight.

14. The apparatus of claim 9 wherein the cushion has a substantially rectangular shape.

15. The apparatus of claim 9 wherein the cushion has a stackable shape.

16. The apparatus of claim 9 wherein the cushion comprises a recess.

17. The apparatus of claim 9 wherein the cushion is a pet furniture cushion.

18. The apparatus of claim 17 wherein said pet furniture cushion is an animal bed.

19. The apparatus of claim 9 further comprising a slider for releasably engaging said first and second pairs of zipper halves.

20. The apparatus of claim 9 wherein the base cover comprises material selected from the group consisting of waterproof material, water resistant material, leather material and non-washable material.

21. The apparatus of claim 9 wherein the base cover comprises a plurality of materials having different material types.

22. The apparatus of claim 9 wherein the removable cover comprises material selected from the group consisting of polyester material, natural material and washable material.

\* \* \* \* \*